United States Patent [19]

Saito

[11] Patent Number: 4,911,473

[45] Date of Patent: Mar. 27, 1990

[54] PASSIVE SEAT BELT SYSTEM WITH IMPROVED SLIDE-ANCHOR-HOLDING STRUCTURE

[75] Inventor: Hiroyuki Saito, Kanagawa, Japan

[73] Assignee: Nippon Seiko Kabushiki Kaisha, Tokyo, Japan

[21] Appl. No.: 304,556

[22] Filed: Feb. 1, 1989

[30] Foreign Application Priority Data

Feb. 5, 1988 [JP] Japan ................................ 63-14308

[51] Int. Cl.⁴ .......................................... B60R 22/06
[52] U.S. Cl. .................................... 280/804; 280/808; 297/483
[58] Field of Search .............. 280/801, 802, 804, 808; 297/483

[56] References Cited

U.S. PATENT DOCUMENTS

| | | | |
|---|---|---|---|
| 4,039,224 | 8/1977 | Bauer et al. .......................... | 297/389 |
| 4,505,496 | 3/1985 | Föhl ..................................... | 280/804 |
| 4,560,187 | 12/1985 | Yoshitsugu .......................... | 280/804 |
| 4,597,607 | 7/1986 | Forkel et al. ........................ | 297/468 |
| 4,653,774 | 3/1987 | Morner ................................ | 280/804 |
| 4,708,367 | 11/1987 | Yoshitsugu ...................... | 297/483 X |
| 4,750,758 | 6/1988 | Yamamoto et al. ................. | 280/804 |

Primary Examiner—Charles A. Marmor
Assistant Examiner—Tamara L. Finlay
Attorney, Agent, or Firm—Wegner & Bretschneider

[57] ABSTRACT

A passive seat belt system with an improved slide-anchor-holding structure is provided. The structure includes a load bearing element and an auxiliary load bearing member. The load bearing element is engageable with a slide anchor when the slide anchor assumes an occupant-restraining position. The auxiliary load bearing element is provided at a position spaced further by a predetermined distance toward an end of a guide rail, the end being on the side of the restraining position, from the point of engagement between the load bearing element and slide anchor. The auxiliary load bearing element has an engaging portion which faces toward the point of connection between the slide anchor and a webbing and is brought into contact and engagement with the slide anchor at least when an angular moment is applied to the slide anchor.

8 Claims, 3 Drawing Sheets

PASSIVE SEAT BELT SYSTEM WITH IMPROVED SLIDE-ANCHOR-HOLDING STRUCTURE

BACKGROUND OF THE INVENTION (a) Field of the Invention:

This invention relates to a passive seat belt system, and more specifically to a slide-anchor-holding structure for a passive seat belt system.

(b) Description of the Related Art:

Referring first to FIGS. 4–7, slide-anchor-holding structures of conventional passive seat belt systems for automotive vehicles are described. An occupant-restraining webbing 3 is connected to a slide anchor 1 having a resin molding 2 which is guided along a guide rail 8 provided in the room of each vehicle. The slide anchor 1 is driven to move between an occupant-restraining position and an occupant-releasing position in accordance with opening and closure of an associated door.

At the occupant-restraining position, the slide anchor 1 engages with a load bearing element 4 such as a pin or bolt (see FIG. 4) or a load bearing element 6 such as an iron plate (see FIG. 6), so that a force applied to the webbing 3 is borne by the bearing element 4 or 6 via the slide anchor 1.

In such a conventional slide anchor, no angular moment is applied to the slide anchor 1 so long as the line of action of a force applied to the webbing 3 lies on an imaginary straight line extending through the point of contact between the slide anchor 1 and the load bearing element 4 or 6. In this case, the force can be successfully borne by the load bearing element 4 or 6. However, when the line of action of the force does not lie on the imaginary straight line, an angular moment whose magnitude is $F \times l$ is produced whereby a force is applied to the slide anchor 1 in a direction that the slide anchor 1 disengages from the load bearing element 4 as depicted in FIG. 5.

Under such an angular moment, it is no longer possible to bear the load by the load bearing element 4. As a result, certain loads are also applied to the guide rail 8 and resin molding 2 respectively. There is thus a potential problem that the guide rail 8 and resin molding 2 may be broken. Where the load bearing element is an iron plate or the like as illustrated in FIG. 6, the iron plate or the like may be deformed in some instances by an angular moment as depicted in FIG. 7.

SUMMARY OF THE INVENTION

It is hence an object of this invention to provide a passive seat belt system in which a slide anchor is maintained substantially free from a force—which may be applied in a direction that the slide anchor may be caused to disengage from an associated load bearing element—even when a force is applied to the slide anchor to produce an angular moment.

It is another object of this invention to provide a passive seat belt system in which guide rail and latch mechanism are maintained substantially free from a force which may be induced by such an angular moment.

In one aspect of this invention, there is thus provided a passive seat belt system which comprises a guide rail, a slide anchor movable along the guide rail, a webbing, a load bearing element and an auxiliary load bearing means. The webbing is connected to the slide anchor so that the slide anchor is movable between an occupant-restraining position where the webbing restrains an occupant and an occupant-releasing position where the the webbing releases the occupant. The load bearing element is engageable with the slide anchor when the slide anchor assumes the occupant-restraining position. The auxiliary load bearing means is provided at a position spaced further by a predetermined distance toward an end of the guide rail, said end being on the side of the restraining position, from the point of engagement between the load bearing element and slide anchor. The auxiliary load bearing means has an engaging portion which faces toward the point of connection between the slide anchor and webbing, and is brought into contact and engagement with the slide anchor at least when an angular moment is applied to the slide anchor.

At least when an angular moment is produced, the auxiliary load bearing means and slide anchor are brought into mutual contact so that a force induced by the angular moment is successfully borne. As a result, the slide anchor is maintained substantially free from a force to be applied in a direction such that the slide anchor is caused to disengage from the load bearing element. Since the slide anchor is practically prevented from turning, the resin molding of the slide anchor and the guide rail can be protected from strong forces so that their breakage, damage, deformation or the like can be avoided.

According to the present invention, the auxiliary load bearing means is provided with the engaging portion which is brought into contact with the slide anchor to bear a force induced by an angular moment. The strength of the slide anchor has therefore increased significantly. The auxiliary load bearing means and engaging portion can be formed with an extremely simple structure, so that the manufacturing cost increases only a little.

Since a force induced by an angular moment is borne by the auxiliary load bearing means, the guide rail and latch mechanism are protected substantially free from such a force. Their peripheral parts are therefore not damaged even when medium to low loads are applied repeatedly due to mild collisions and braking operations.

BRIEF DESCRIPTION OF THE DRAWINGS

The above and other objects, features and advantages of the present invention will become apparent from the following description and the appended claims, taken in conjunction with the accompanying drawings, in which:

DETAILED DESCRIPTION OF THE INVENTION

Figure 1:
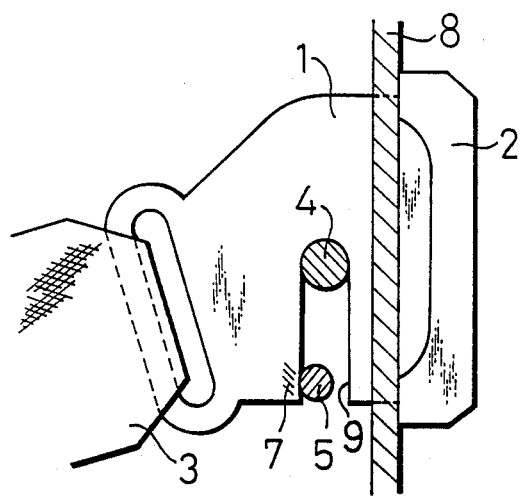
FIG. 1 is a fragmentary side view of a passive seat belt system according to a first embodiment of this invention, in which a slide anchor is shown along with bolts or pins as a load bearing element and an auxiliary load bearing member.

Referring first to FIG. 1, the first embodiment of this invention will be described. A slide anchor 1 has been designed to move while being guided by the resin molding 2 along the guide rail 8. The slide anchor 1 defines a slot 9 opening toward one end of the guide rail. The end is on the occupant-restraining side, in other words, is at a lower position as viewed in FIG. 1 and will hereinafter be referred to as the "rear end" for the sake of brevity. An edge of the slot 9, said edge being on the side closer to the point of connection between the slide anchor 1 and webbing 3, is substantially straight and parallel to the guide rail 8. At the occupant-restraining position, the slide anchor 1 engages at an innermost part of the slot 9 with the pin or bolt 4 (hereinafter called the "pin 4") as a load bearing element as shown in the drawing, whereby a force applied to the webbing 3 which is connected to the slide anchor 1 is transmitted to the pin 4 and further to an unillustrated vehicle body.

The slide anchor 1 is provided with an auxiliary load bearing part 7, which is normally maintained in contact with another pin or bolt 5 (hereinafter called the "pin 5") as an auxiliary load bearing member. The auxiliary load bearing part 7 and its matching pin 5 are located at positions closer toward the rear end of the guide rail than the point of engagement between the slide anchor 1 and the pin 4. The auxiliary load bearing part 7 is integral with the slide anchor 1, and may be formed at the same time as the slide anchor 1 is formed by pressing or the like. On the other hand, the pin 5 is provided fixedly on the vehicle body like the pin 4. When the webbing 3 is applied with a force whose line of action does not lie on an imaginary straight line extending through the point of engagement between the slide anchor 1 and the pin 4, an angular moment is produced on the slide anchor 1. A force induced by the angular moment is however borne by the engagement between the auxiliary load bearing part 7 and the pin 5, so that the slide anchor 1 is prevented from turning. Accordingly, no force is applied to the slide anchor 1 in a direction that the slide anchor 1 could be caused to disengage from the pin 4.

Figure 2:
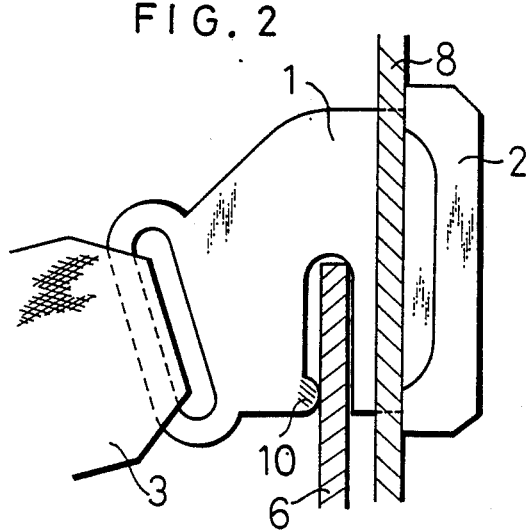
FIG. 2 is a fragmentary side view of a passive seat belt system according to a second embodiment of this invention, in which a slide anchor is shown along with an iron plate as a load bearing element.
Figure 4:
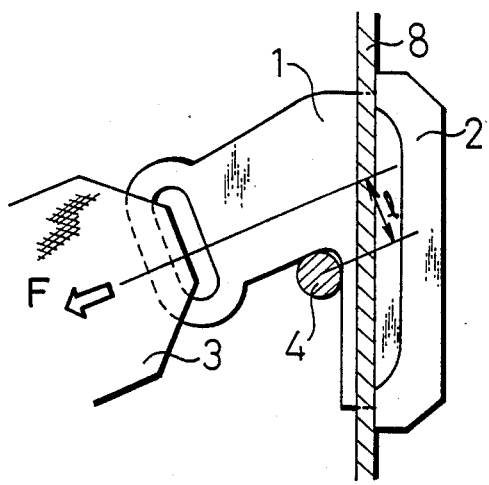
FIG. 4 is a fragmentary side view of a conventional passive seat belt system, in which a slide anchor is depicted along with a bolt as a load bearing element.
Figure 5:
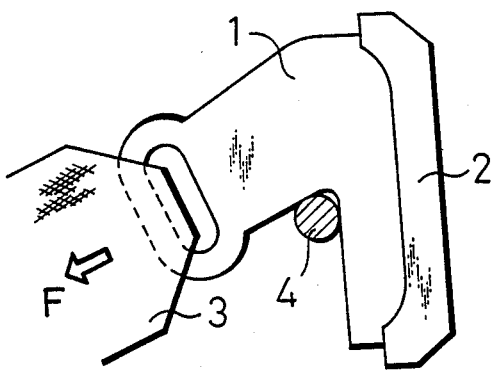
FIG. 5 illustrates the slide anchor of FIG. 4, which has turned counterclockwise about a bolt as a load bearing element by an angular moment produced upon application of a force F as shown in FIG. 4.
Figure 6:
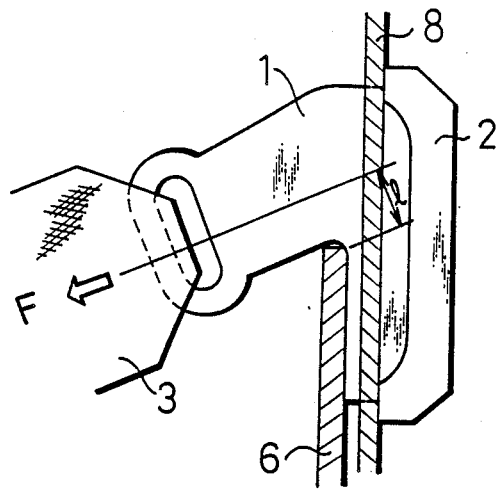
FIG. 6 is a fragmentary side view of another conventional passive seat belt system, in which a slide anchor is depicted along with an iron plate as a load bearing element.
Figure 7:
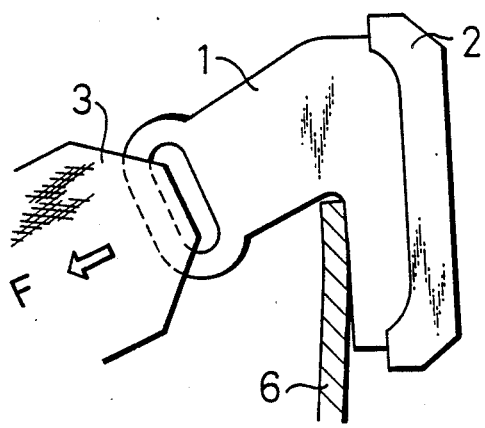
FIG. 7 shows the slide anchor of FIG. 6, which has turned counterclockwise about an upper edge of an iron plate as a load bearing element by an angular moment produced upon application of a force F as shown in FIG. 6.

The second embodiment of this invention will next be described with reference to FIG. 2. At the occupant-restraining position, a slide anchor 1 engages with an iron plate 6 as a load bearing element so that a force applied to the webbing 3 can be transmitted to the iron plate 6 and further to the vehicle body. A protrusion 10 extending toward the guide rail 8 is formed as an auxiliary load bearing part on the slide anchor 1. The protrusion 10 can be formed in much the same way as the auxiliary load bearing part 7 in the first embodiment. The protrusion 10 is normally in contact with the iron plate 6 to bear any angular moment which may be produced on the slide anchor 1.

Figure 3:
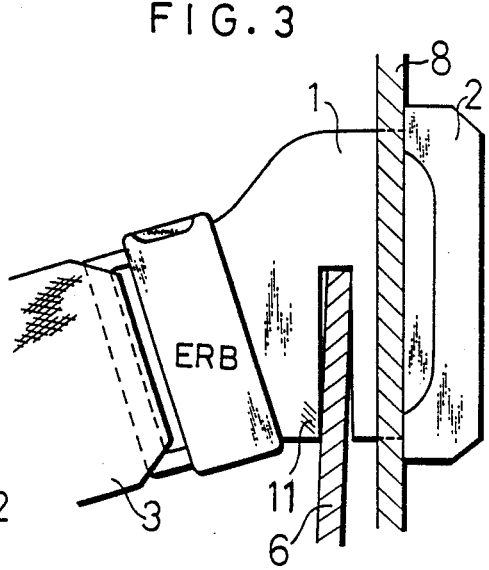
FIG. 3 is a fragmentary side view of a passive seat belt system according to a second embodiment of this invention, in which a slide anchor is shown along with an iron plate as a load bearing element.

Finally, the third embodiment of this invention will be described with reference to FIG. 3. A slide anchor 1 is provided with an auxiliary load bearing part 11 which is similar to the auxiliary load bearing part 7 in the first embodiment. If an angular moment occurs on the slide anchor 1, the auxiliary load bearing part 11 is brought into contact with the iron plate 6. The third embodiment is thus similar to the second embodiment in this respect. However, the auxiliary load bearing part 11 slightly turns only when an angular moment is produced on the slide anchor 1. As a result, the auxiliary load bearing part 11 is brought into contact with the iron plate 6 as shown in the drawing to beat any force induced by the angular moment. While no angular moment is produced, the auxiliary load bearing part 11 is maintained out of contact with the iron plate 6.

I claim:

1. A passive seat belt system comprising:
    a guide rail;
    a slide anchor movable along the guide rail;
    a webbing connected to the slide anchor so that the slide anchor is movable between an occupant-restraining position where the webbing restrains an occupant and an occupant-releasing position where the the webbing releases the occupant;
    a load bearing element engageable with the slide anchor when the slide anchor assumes the occupant-restraining position;
    an auxiliary load bearing means provided at a position spaced further by a predetermined distance toward an end of the guide rail, said end being on the side of the restraining position, from the point of engagement between the load bearing element and slide anchor, said auxiliary load bearing means having an engaging portion which faces toward the point of connection between the slide anchor and webbing and is brought into contact and engagement with the slide anchor at least when an angular moment is applied to the slide anchor.

2. The passive seat belt system as claimed in claim 1, wherein the load bearing element is a bolt.

3. The passive seat belt system as claimed in claim 1, wherein the auxiliary load bearing means has an auxiliary load bearing member provided at a position closer toward the end of the guide rail than the position of the load bearing element.

4. The passive seat belt system as claimed in claim 3, wherein the slide anchor defines a slot opening toward the end of the guide rail, the slide anchor engages with the load bearing element at an inner most part of the slot, and an auxiliary load bearing part capable of contacting and engaging with the auxiliary load bearing member is formed in the vicinity of an opening of the slot.

5. The passive seat belt system as claimed in claim 4, wherein an edge of the slot, said edge being on the side closer to the point of connection between the slide anchor and webbing, is substantially straight and parallel to the guide rail.

6. The passive seat belt system as claimed in claim 1, wherein the slide anchor defines a slot opening toward the end of the guide rail, the slide anchor engages with the load bearing element at an innermost part of the slot, and an auxiliary load bearing part capable of contacting and engaging with the load bearing element is formed in the vicinity of an opening of the slot.

7. The passive seat belt system as claimed in claim 6, wherein the auxiliary load bearing part is a protrusion extending toward the guide rail.

8. The passive seat belt system as claimed in claim 6, wherein the auxiliary load bearing part engages with the load bearing element only when an angular moment has been applied to the slide anchor.

* * * * *